United States Patent [19]

Ensminger

[11] Patent Number: 4,554,034

[45] Date of Patent: Nov. 19, 1985

[54] BONDING CAPSULES

[75] Inventor: Dale Ensminger, Columbus, Ohio

[73] Assignee: Battelle Memorial Institute, Columbus, Ohio

[21] Appl. No.: 671,665

[22] Filed: Nov. 15, 1984

[51] Int. Cl.[4] .................. B29C 27/08; B65D 83/04
[52] U.S. Cl. .................................. 156/69; 156/73.1;
156/294; 156/423; 156/580.1; 156/580.2;
206/530; 220/DIG. 31
[58] Field of Search ............... 156/69, 73.1, 145, 146,
156/294, 423, 580.1, 580.2; 206/530;
220/DIG. 31; 53/471, 478

[56] References Cited

U.S. PATENT DOCUMENTS 3,773,205 11/1973 Keeler et al. ................. 156/73.1
4,325,761 4/1982 Pace ................................ 156/294
4,466,844 8/1984 MacLaughlin et al. .......... 156/69
4,478,658 10/1984 Wittwer ........................... 156/69

Primary Examiner—Michael Wityshyn
Attorney, Agent, or Firm—Philip M. Dunson

[57] ABSTRACT

Methods and apparatus for bonding an overlapping portion of the outer cap (7,7') and inner body (6, 6') of a closed cylindrical capsule (5). A flexible tubular coupling (13,14,20) positioned around the circumference of the capsule (5) is compressed to exert an inward radial force (23) on the capsule (5) while ultrasonic vibratory motion is applied in a direction (12,12') parallel to the axis of the capsule (5) by an ultrasonic transducer (10,10') with a rigid tip (11,11') attached to the coupling (13,14,20). For bonding of gelatinous capsules (5), the unitary coupling (20) or split coupling (13,14) can comprise a polymeric elastomer material such as latex rubber with approximately the same acoustical impedance as the capsule (5).

16 Claims, 4 Drawing Figures

U.S. Patent  Nov. 19, 1985  4,554,034
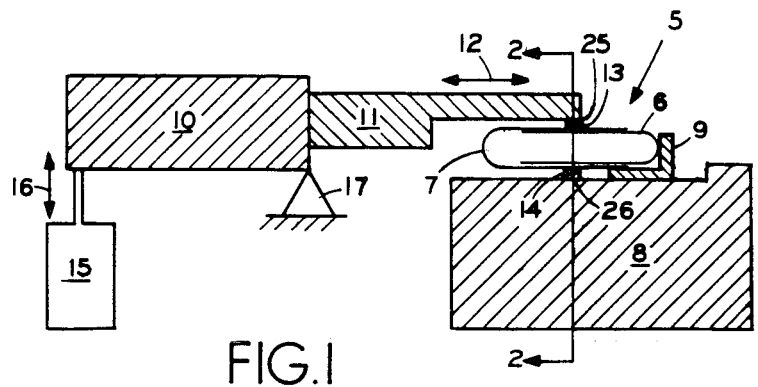
FIG.1
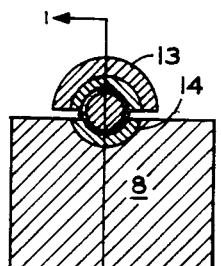
FIG.2
FIG. 3
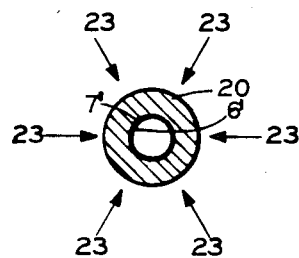
FIG. 4
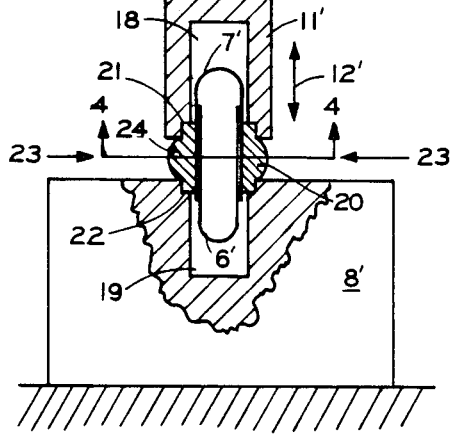

BONDING CAPSULES

FIELD

This invention relates to methods and apparatus for bonding capsules. It has to do more particularly with the use of ultrasonic energy to provide a circumferential bond on gelatinous capsules and the like to make them tamperproof.

BACKGROUND

Instances of criminal tampering with gelatinous capsules to alter their contents have alarmed the public in the past. Manufacturers have responded by providing improved packaging so that any tampering with the box or bottle containing the capsules is evident to the user. A further protection to the consumer can be provided by bonding the exterior of each capsule in a manner such that it can not be opened without visibly damaging the capsule.

Medicinal capsules are typically produced by filling a small dissolvable, gelatinous, U-shaped body with medicinal powder and then placing another similar gelatinous cap of larger diameter over the open end of the filled body to close the capsule. Capsules made in this manner are easily opened. The criteria for developing a tamperproof medicinal capsule are guided by the end use of the product. The product is taken orally. A typical patient's favorable reaction to the appearance of the capsule and avoidance of any discomfort to the patient in swallowing the capsule are significant factors in marketing the product.

Several methods have been used or studied for producing tamperproof capsules. Typical methods have included heat sealing, microwave sealing, and conventional industrial-type ultrasonic welding, which have limitations in the product quality or manufacturing efficiency. Heat sealing of the capsule cap and body is accomplished with an external heating element that produces a local brand-like distortion and discoloration. Microwave sealing does not leave a brand mark but produces undesirable discoloration and reduction in moisture content. To compensate for discoloration, a change in gel formulation for the capsule is required.

Ultrasonic welding is based upon interfacial or internal absorption of energy. Conventional commercial-type ultrasonic welders have been evaluated in which the ultrasonic motion of the tip of the welding tool is in the radial direction of the capsule. The weld produced is a short bar-shaped impression on one side of the capsule. Capsules have very thin walls and the finished capsule feels soft to the touch. Thus, the conventional ultrasonic welding mode is not efficient because it depends on capsule wall flexing caused ultrasonically and other losses at the tip of the welding horn to produce the weld. This method requires higher amplitudes of vibration and higher power into the welding transducer than should be necessary and results in a greater number of damaged capsules than are acceptable (a damage rate of 0.5 percent is typically the highest that is acceptable in the industry). Furthermore, the conventional ultrasonic welding method cannot accommodate the typical variations in capsule dimensions wherein some capsule walls are thicker than normal and others are thinner than normal. Also, typical production variations in the diameter of the cap and body are sufficiently large that conventional ultrasonic welding can result in distortion of the capsule, which is objectionable.

A variation of conventional ultrasonic welding involves rotation of the capsule to provide a circumferential weld, as in Japanese Pat. No. 833, January 1965. For conventional ultrasonic welding, the movement of the welding tip is in a plane perpendicular to the capsule axis. If the cap has the same diameter as the body and they are axially aligned and held together by suction on the outer side walls, a butt-type welding joint can be achieved by applying axial ultrasonic motion and axial compression forces between the cap and body as suggested by Japanese Pat. No. 59021, April 1983.

Alternatively, as disclosed in U.S. Pat. No. 4,325,761, Pace, the U-shaped cap can be produced with an interior circumferential shoulder against which the open end of the U-shaped body is pressed (axial compression) while applying ultrasonic motion in an axial direction to produce an internal circumferential butt weld. The methods of conventional ultrasonic welding described in the prior art are inefficient; they also produce poor welds and an unacceptable number of damaged capsules or require complex capsule holding devices or expensive special modification of the capsule cap design to achieve butt-type welds.

DISCLOSURE

Typical apparatus according to the present invention, for bonding an overlapping portion of the outer cap and inner body of a closed largely cylindrical capsule, comprises flexible coupling means positioned around and contiguous to at least a part of the outer circumference of the overlapping portion of the cap, means for compressing the coupling means to provide an inward compressive force on the capsule, and means for applying ultrasonic energy to the coupling means in a direction substantially parallel to the axis of the capsule to provide a bond between the cap and the body over at least a substantial portion of the part of the capsule in contact with the coupling means.

The ultrasonic motion is applied in an approximately axial direction to a cylindrical capsule to cause a shear stress while the capsule walls are maintained in tight contact by simultaneous applicaton of a compressional stress in an inward radial direction. A tamperproof bond is produced without distortion of the capsule as commonly encountered by capsule wall flexure. Typical apparatus comprises an ultrasonic transducer and rigid tip with an attached flexible coupling that can be positioned around and contiguous to at least a part of the outer circumference of the overlapping portion of the cap, means for compressing the flexible coupling to provide an inward radial compressive force on the capsule while ultrasonic vibrational energy is provided by the ultrasonic transducer through the rigid tip to the flexible coupling in a direction approximately parallel to the capsule walls to bond the body and cap. An advantageous feature of the invention is a flexible circumferential coupling that is closely matched acoustically to the capsule casing and can accommodate production variations in diameter and wall thickness of the capsule cap and body to be bonded.

DRAWINGS

FIG. 1 is a schematic front sectional view, as indicated at 1—1 in FIG. 2, of typical apparatus for ultrasonic bonding of capsules according to this invention.

FIG. 2 is a sectional end view of the apparatus as indicated at 2—2 in FIG. 1.

FIG. 3 is a schematic front partially sectional view of another typical embodiment of the invention.

FIG. 4 is a cross-sectional view as indicated at 4—4 in FIG. 3.

CARRYING OUT THE INVENTION

Referring now to FIGS. 1 and 2, a typical cylindrical capsule 5 comprises a U-shaped body 6 containing medicinal powder and a similar cap 7 of slightly larger diameter that is slipped over the open end of the body 6 to form a closure. The closed capsule 5 is positioned on an anvil 8 against a capsule stop 9 which may be part of a conveyor mechanism, not shown. The capsule stop 9 is primarily for axial positioning of the capsule and can be retracted from contact with the capsule prior to the bonding operation.

An ultrasonic transducer 10 with an attached rigid tip 11 produces high frequency (e.g. 20 kHz) vibratory motion in a direction 12 approximately parallel to the axis of the capsule. A split coupling 13,14 comprising an upper half 13 attached at an interface 25 to the tip 11 and a lower half 14 attached at an interface 26 to the anvil 8 has an inner diameter approximately conforming to the outer diameter of the capsule cap 7. A controlled force mechanism 15 acting on the transducer 10 provides movement in a direction 16 perpendicular to the capsule axis about a fulcrum 17 such that the tip 11 exerts a controlled compressive force on the coupling 13,14 and the capsule 5 in an inward approximately radial direction. The compressive force is sufficient to bring the inner diameter of the cap 7 and the outer diameter of the body 6 into close contact with only minimal flexure of the capsule walls.

While the compressive force is maintained on the capsule 5, the ultrasonic transducer 10 is activated for a fraction of a second to produce a vibratory shear stress to produce at least a partial circumferential bond of the gelatinous capsule 5 in the area contacted by the coupling 13,14. Thereafer, the motion of the controlled force mechanism 15 is reversed to release the compressive force on the capsule 5 which is ejected and replaced by a new capsule to be bonded.

FIGS. 3 and 4 are schematic sectional views of another typical embodiment of apparatus that has been used for experimental demonstration of ultrasonic bonding of medicinal capsules and the like according to this invention. As shown in FIG. 3, the capsule was oriented vertically with the cap 7' in a cavity 18 in the tip 11' attached to the ultrasonic transducer 10'. The capsule body 6' extended into a cavity 19 in the anvil 8'. A conforming coupling 20 of elastomer tubing was slipped over the cap 7' and the assembly was inserted in the cavity 18 of the tip 11' with one end of the coupling 20 against the shoulder 21 in the cavity 18. The transducer 10' was lowered so that the other end of the coupling 20 was against the shoulder 22 of the cavity 19 in the anvil 8'.

A weight or other controlled force providing means, not shown, exerted a downward force 16' on the transducer 10' an the tip 11' causing the coupling 20 to be compressed between the tip 11' and the anvil 8'. Axial compression of the flexible coupling 20 caused a compressive force to be exerted also in an inward approximately radial direction 23 shown in FIGS. 3 and 4 around the cap 7' to press it into contact with the body 6'. The amount of radial compressive force 23 could be visually gauged by the bulge 24 in the coupling 20 illustrated in FIG. 3. The ultrasonic transducer 10' was actuated to produce a high frequency vibratory motion of the tip 11' in a direction 12' predominantly parallel to the axis of the capsule. The resulting vibratory shear stress transmitted via the coupling 20 to the interface of the cap 7' and the body 6' while subjected to a radial compressive force 23 produced a circumferential bond of the cap 7' and body 6' adjacent the coupling 20, which effectively sealed the contents of the capsule.

Several readily available coupling materials in the form of flexible elastomeric tubing, were evaluated. The best results were obtained with thick-walled, rubber latex tubing which was used repeatedly to achieve excellent bonds on commerical capsules. Other materials with similar properties that are closely acoustically matched to the gelatinous capsules can be used in a production system. Data and procedures for measurement of acoustic properties of materials and selection of materials for close acoustical match are well-known and are covered in textbooks on ultrasonics ["Ultrasonics, The Low and High-Intensity Applications", by Dale Ensminger, Marcel Dekkar, Inc. New York, 1973].

An advantageous feature of the present invention is the use of a flexible, comformable, unitary, coupling 20 as shown in FIGS. 3 and 4 or a flexible, conformable, split coupling 13,14, as shown in FIGS. 1 and 2. Bonding is achieved during simultaneous application of two forces, namely, a compressive force in an inward radial direction and an ultrasonic vibratory force in a direction approximately parallel to the capsule walls. The tip, 11 or 11' does not directly contact the capsule 5. The ultrasonic energy is applied through the unitary coupling 20 or the split coupling 13,14. Localized absorption of frictional energy is obtained adjacent to the coupling from vibratory motion in an axial direction mainly at the coaxial interface between the cap and the body and by internal absorption of energy within the walls of the cap and body, and to a lesser extent by internal absorption of energy within the coupling and at the coaxial interface of the coupling and the cap (there is no bonding of cap and coupling). The functions of the flexible coupling are (1) to couple efficiently the ultrasonic energy from the transducer 10 and tip 11 into the capsule 5 and (2) to shape the softened capsule wal materials into an appealing form.

The apparatus for bonding capsules according to this invention can be designed according to objectives such as degree of bonding desired and automation features related to the capsule conveyor mechanism. For example, apparatus as shown in FIGS. 3 and 4 will produce complete bonding of the cap and body around the circumference of the capsule, which seals the capsule. However, for purposes of producing a tamperproof capsule, bonding over a portion of the circumference may be sufficient. Apparatus as shown in FIG. 1 provides effective bonding at least over approximately the half of the circumference contacted by the top-half coupling 13. It has been observed in experimental studies that under some conditions, some bonding occurs in the half of the circumference in contact with the bottom-half coupling 14. This suggests that some of the ultrasonic energy is transmitted from the tip 11 via the top-half coupling 13 to the capsule and thence to the bottom-half coupling 14. If it is desired to insure good bonding over practically the entire circumference of the capsule, the apparatus as shown in FIG. 1 can be modified by addition of another tip 11 to drive the bottom-half coupling 14. Methods of designing a split tip attached to split couplings 13,14, that can open and close on the capsule 5 in an automated conveyor assembly line process are well known.

For this invention, the direction of ultrasonic motion can be in any direction that is approximately parallel to the axis of the capsule 5 such as horizontal vibratory motion 12 in FIG. 1 or vertical vibratory motion 12' in FIG. 3.

Apparatus such as is shown in FIG. 3 may also be used with a suitable conveyor mechanism, not shown, that moves a vertically-oriented capsule with the cap 7' on top into position under the transducer 10' and tip 11' which are initially in a vertically retracted position. The coupling 20 is bonded to the tip 11' at the shoulder 21 and is retracted with the tip 11'. Since the coupling 20 has a slightly larger inside diameter than the outside diameter of the cap 7', it will slip over the cap 7' when the tip 11' is advanced vertically downward to the bonding position shown in FIG. 3. A bevel can be provided on the entry to the cavity 19 in the anvil 8' to guide the free end of the coupling 20 such that it is engaged and stopped by shoulder 22. Further advance of the tip 11' compresses the coupling 20 to provide the bulge 24 and the desired compression force 23 in an inward radial direction. Following activation of the transducer 10' for a fraction of a second, the tip 11' is retracted vertically upward and the bonded capsule is released from the conforming coupling 20 to complete the cycle.

The apparatus and methods of this invention can be adapted in several ways to the production of tamper-proof capsules. For example, capsules that are filled and closed with the cap 7 in place over the body 6 might be randomly oriented prior to the bonding operation. Apparatus as illustrated in FIG. 1 is especially adaptable to a use with capsule conveyor means in which either the capsule end with the body 6 is positioned by the stop 9 as in FIG. 1 or the capsule end with the cap 7 is positioned by the stop 9, for bonding at the approximate midpoint of the capsule length. Similarly, apparatus as shown in FIG. 3 can be adapted to bond vertically oriented capsules in which either the cap 7' or the body 6' is on top.

Apparatus similar to that shown in FIG. 3 is especially adaptable for integration in automatic capsule filling equipment. For example, the capsule body 6' is typically held in a vertical position with the open end on top for filling with a desired material such as medicinal powder prior to putting on the cap 7' for closure. The apparatus that holds the cap 7' for closure can be modified similar to FIG. 3 to comprise the coupling 20, the tip 11', and the transducer 10', so that the capsule 5 can be closed and bonded according to this invention practically simultaneously.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. Apparatus for bonding an overlapping portion of the outer cap and inner body of a closed largely cylindrical capsule, comprising
    flexible coupling means positioned around and contiguous to at least a part of the outer circumference of the overlapping portion of the cap,
    means for compressing the coupling means to provide an inward compressive force on the capsule, and
    means for applying ultrasonic energy to the coupling means in a direction substantially parallel to the axis of the capsule to provide a bond between the cap and the body over at least a substantial portion of the part of the capsule in contact with the coupling means.

2. Apparatus as in claim 1, wherein the energy applying means comprises rigid means in contact with at least a portion of the coupling means.

3. Apparatus as in claim 1, wherein the coupling means comprises a section of flexible tubing having an inside diameter approximately the same as the outer diameter of the cap.

4. Apparatus as in claim 3, wherein the flexible tubing has approximately the same acoustical impedance as that of the capsule material.

5. Apparatus as in claim 3, wherein the flexible tubing is split axially into two halves.

6. Apparatus as in claim 3, wherein the flexible tubing comprises a polymeric elastomer material.

7. Apparatus as in claim 6, wherein the elastomer material comprises latex rubber.

8. A method of bonding an overlapping portion of the outer cap and inner body of a closed largely cylindrical capsule, comprising
    placing flexible coupling means around and contiguous to at least a part of the outer circumference of the overlapping portion of the cap,
    compressing the coupling means to provide an inward compressive force on the capsule, and
    applying ultrasonic energy to the coupling means in a direction substantially parallel to the axis of the capsule to provide a bond between the cap and the body over at least a substantial portion of the part of the capsule in contact with the coupling means.

9. A method as in claim 8, wherein the ultrasonic energy is applied by rigid means in contact with at least a portion of the coupling means.

10. A method as in claim 8, wherein the coupling means comprises a section of flexible tubing having an inside diameter approximately the same as the outer diameter of the cap.

11. A method as in claim 10, wherein the flexible tubing is split axially into two halves.

12. A method as in claim 10, wherein the flexible tubing is acoustically matched to the capsule material.

13. A method as in claim 10, wherein the flexible tubing comprises a polymeric elastomer material.

14. A method as in claim 13, wherein the elastomer material comprises latex rubber.

15. A method as in claim 8, wherein the capsule is gelatinous.

16. A method as in claim 8, wherein the capsule is dissolvable and digestible.

* * * * *